United States Patent [19]
Schmid

[11] Patent Number: 4,577,741

[45] Date of Patent: Mar. 25, 1986

[54] FLUID-OPERATED SERVOMOTOR FOR ACTUATION OF CLUTCHES OR THE LIKE

[75] Inventor: Christoph Schmid, Wooster, Ohio

[73] Assignee: Luk Lamellen und Kupplungsbau GmbH, Bühl, Fed. Rep. of Germany

[21] Appl. No.: 465,266

[22] Filed: Feb. 9, 1983

[30] Foreign Application Priority Data

Feb. 13, 1982 [DE] Fed. Rep. of Germany ....... 3205155

[51] Int. Cl.[4] .................. F16D 25/08; F15B 13/04
[52] U.S. Cl. ............................. 192/85 V; 192/88 A
[58] Field of Search ............ 192/88 A, 85 V, 85 CA, 192/91 A; 91/294, 454, 457

[56] References Cited

U.S. PATENT DOCUMENTS

| | | | |
|---|---|---|---|
| 3,378,121 | 4/1968 | Foret | 192/85 V |
| 4,426,915 | 1/1984 | Maucher et al. | 192/85 V |
| 4,467,901 | 8/1984 | Hattori et al. | 192/85 V |

FOREIGN PATENT DOCUMENTS

| | | | |
|---|---|---|---|
| 454861 | 3/1935 | United Kingdom | 192/85 V |
| 839889 | 6/1960 | United Kingdom | 192/91 A |

Primary Examiner—Rodney H. Bonck
Attorney, Agent, or Firm—Peter K. Kontler

[57] ABSTRACT

A servomotor wherein a piston is reciprocable in a cylinder and is connected with the disengaging mechanism of a friction clutch. A suction chamber at one side of the piston is connected to a suction generating device in response to opening of a first solenoid-operated valve whereby the piston moves from a first to a second end position to thereby reduce the volume of the chamber to a minimum value and to automatically close a shutoff valve which seals the chamber from the suction generating device independently of the solenoid-operated valve as soon as the piston reaches its second end position. A second solenoid-operated valve can connect the chamber with or seal the chamber from the atmosphere independently of the shutoff valve. The shutoff valve reduces the reaction time of the servomotor as regards the return movement of the piston to its first end position under the action of the disengaging mechanism and/or a coil spring, and the shutoff valve also reduces the stress upon a deformable membrane which forms part of the piston.

16 Claims, 1 Drawing Figure

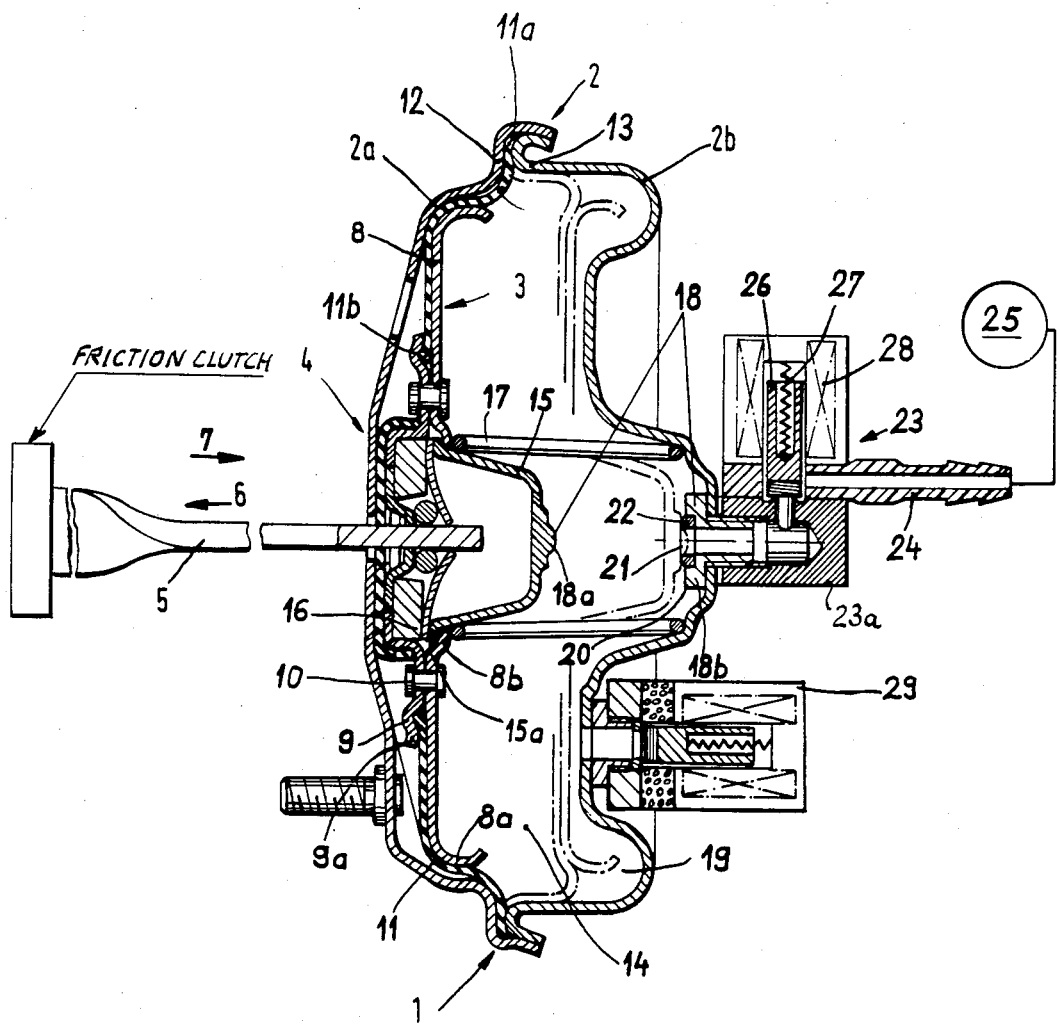

FLUID-OPERATED SERVOMOTOR FOR ACTUATION OF CLUTCHES OR THE LIKE

CROSS-REFERENCE TO RELATED CASE

The servomotor which is disclosed in the present application constitutes an improvement over and a further development of the servomotor which is disclosed in the commonly owned copending patent application Ser. No. 261,292 filed May 7, 1981 by Paul Maucher et al. for "Fluid-operated servomotor for actuation of clutches or the like", now U.S. Pat. No. 4,426,915 granted Jan. 24, 1984.

BACKGROUND OF THE INVENTION

The present invention relates to servomotors in general, and more particularly to improvements in fluid-operated servomotors which can be utilized to actuate various types of machines, apparatus or other aggregates, such as clutches in automotive vehicles. Still more particularly, the invention relates to improvements in fluid-operated servomotors of the type disclosed in the aforementioned copending patent application Ser. No. 261,292 wherein a piston is reciprocable in a housing in response to evacuation of air from or admission of air into, a chamber at one side of the piston, and the piston is connected with a motion transmitting member which can actuate the aggregate or aggregates.

The servomotor which is disclosed in the copending application Ser. No. 261,292 is constructed and assembled in such a way that the opening of a first valve results in connection of the chamber with a suction generating device or a source of compressed air, and opening of a second valve results in connection of the chamber with the atmosphere. The motion transmitting member is coupled to the piston by a compensating device which allows for axial shifting of the motion transmitting member in one end position of the piston so that the motion transmitting member can select its axial position in dependency on the extent of wear upon the parts of the aggregate and/or other parameters. The piston bears against a first section of the housing of the servomotor in the one end position and against another section of the housing in another end position. A membrane which forms part of, or is connected to, the piston serves as a means for preventing uncontrolled communication of the chamber with the atmosphere, e.g., along the aforementioned motion transmitting member. The membrane is subjected to extensive stresses, particularly while the chamber is connected with the suction generating device.

OBJECTS AND SUMMARY OF THE INVENTION

An object of the invention is to provide a novel and improved servomotor which is constructed and assembled in such a way that the interval which elapses for actuation or termination of actuation of the aggregate or aggregates is reduced to a fraction of the interval that is required in heretofore known servomotors.

Another object of the invention is to provide a servomotor which can be used as a superior substitute for heretofore known servomotors.

An additional object of the invention is to provide a servomotor wherein certain sensitive parts, such as membranes, are subjected to less pronounced and shorter-lasting stresses than in conventional fluid-operated servomotors.

A further object of the invention is to provide a fluid-operated servomotor with a piston which embodies or carries a membrane and wherein the useful life of the membrane is much longer than in conventional servomotors.

Still another object of the invention is to provide a novel and improved method of regulating the pressure in the chamber of a fluid-operated servomotor for actuation of clutches or the like.

An additional object of the invention is to provide a novel system of valve means for use in a servomotor of the above outlined character.

A further object of the invention is to provide a rapidly reacting servomotor which is neither costlier nor bulkier nor more complex than heretofore known servomotors.

An ancillary object of the invention is to provide a novel and improved piston for use in a servomotor of the above outlined character.

Another object of the invention is to provide a novel and improved combination of an aggregate, such as a friction clutch, and a servomotor of the above outlined character.

A further object of the invention is to provide an aggregate, such as a clutch, with novel and improved means for reducing the reaction or response time and for enhancing the predictability of response of the aggregate on actuation of activation of the servomotor.

One feature of the invention resides in the provision of a fluid-operated servomotor for actuation of friction clutches in automotive vehicles or the like. The servomotor comprises a prime mover including a first component constituting a stationary cylinder or housing and a second component constituting a piston which is reciprocable in the cylinder between first and second end positions and which defines with the cylinder a chamber whose volume varies in response to movement of the piston between its end positions. The servomotor further comprises means (e.g., the clutch and/or one or more springs) for yieldably biasing or urging the piston to one of its end positions, and means for moving the piston to the other end position. Such moving means includes means for establishing a pressure differential between the chamber and the atmosphere, and such pressure differential establishing means comprises means defining a path for the flow of fluid to and from the chamber. Still further, the servomotor comprises a shutoff valve for sealing the just mentioned path in response to movement of the piston to its other end position. The path defining means preferably comprises a second valve (most preferably a solenoid-operated valve, which is actuatable to permit or prevent the flow of fluid along the path). Such second valve can be disposed downstream of the shutoff valve, as considered in the direction of fluid flow from the chamber along the aforementioned path. A third valve (preferably a solenoid-operated valve) can be provided to connect the chamber with or to seal the chamber from the atmosphere.

The shutoff valve preferably comprises a first portion which is movable with the piston and a second portion which is provided on the cylinder. At least one portion of the shutoff valve can be integral with or separably secured to the respective component of the prime mover. The first portion of the shutoff valve can be mounted directly on the piston; such first portion can include or constitute a valving element and the second portion of the shutoff valve then includes or constitutes a seat for the valving element.

If the chamber is a suction chamber, the pressure differential establishing means includes a suction generating device which serves to draw air from the chamber along the aforementioned path in open positions of the shutoff valve and the second valve. The second portion of the shutoff valve can define a portion of the path, and the valving element sealingly engages such second portion of the shutoff valve in the second end position of the piston.

The piston can include a deformable membrane which undergoes deformation in response to movement of the piston between its end positions. The piston can further comprise a cupped sealing member having a portion (e.g., a protuberance) which constitutes the valving element of the shutoff valve. The second portion of the shutoff valve then includes a seat preferably having an elastic washer which surrounds a portion of the path (e.g., the inlet of the path, as considered in the direction of fluid flow from the chamber) and is engaged by the protuberance to seal the inlet in the second end position of the piston. The cupped member preferably consists of an elastomeric synthetic plastic material.

The second and third valves are actuatable independently of the shutoff valve to respectively open or close the path and to connect or disconnect the chamber from the atmosphere.

The volume of the chamber is preferably reduced to a minimum value in the second end position of the piston, especially if the chamber is a suction chamber.

The novel features which are considered as chacteristic of the invention are set forth in particular in the appended claims. The improved servomotor itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a central sectional view of a servomotor which is constructed and assembled in accordance with one embodiment of the invention, the idle or starting position of the piston of the prime mover of the servomotor being shown by solid lines and its right-hand end position being shown by phantom lines.

DESCRIPTION OF THE PREFERRED EMBODIMENTS

The drawing shows a fluid-operated servomotor 1 which comprises a prime mover including a housing or cylinder 2 and a piston-shaped component 3 (hereinafter called piston for short). The piston 3 carries a compensating device 4 which is constructed and assembled in a manner as disclosed in the aforementioned copending patent application Ser. No. 261,292 of Maucher et al. The purpose of the compensating device 4 is to reciprocate (see the arrows 6 and 7) a motion transmitting member 5 which can constitute a flat steel bar and the lefthand end portion of which serves to shift the disengaging means of a clutch in an automotive vehicle. A clutch wherein the disengaging means can receive motion from the member 5 is described and shown, for example, in the commonly owned U.S. Pat. application Ser. No. 175,870 filed Aug. 6, 1980 by Paul Maucher et al. for "Friction Clutch", now U.S. Pat. No. 4,368,810 granted Jan. 18, 1983. The disclosure of the patent to Maucher et al. is incorporated herein by reference.

The construction of the compensating device 4 is such that, when it assumes the normal or idle position which is shown in the drawing, the motion transmitting member 5 is free to move back and forth in directions indicated by the arrows 6 and 7. This enables the member to assume any one of a practically infinite number of different positions and to thereby compensate for wear upon and/or changes in positions of parts of the disengaging means in the clutch 30. For example, swelling of friction discs in the clutch can also entail some axial shifting of the motion transmitting member 5.

The piston 3 comprises a ring-shaped supporting portion 8 which carries the compensating device 4. The connection between the supporting portion 8 and the compensating device 4 comprises a sheet-metal carrier 9 which is secured to the portion 8 by rivets 10. The piston 3 further comprises an apertured membrane 11 having a preferably beaded outer marginal portion 11a which is sealingly held between the outer marginal portions 12 and 13 of the housing sections 2a and 2b. The preferably beaded inner marginal portion 11b of the membrane 11 is connected to the supporting portion 8 of the piston 3. The radially outermost portion 9a of the carrier 9 clampingly engages the inner marginal portion 11b of the membrane 11 in response to proper application of the rivets 10.

The radially outermost part 8a of the supporting portion 8 of the piston 3 extends in the axial direction of the housing 2 (i.e., the part 8a can be said to constitute a relatively short cylinder) and serves as an abutment or support for the adjacent portion of the membrane 11. The latter can follow the outline of the part 8a during axial movement of the piston 3 with reference to the housing 2. The membrane 11 resembles a bellows and its intermediate portion rolls along the inner side of the housing section 2b in response to axial movement of the piston 3. The intermediate part of the supporting portion 8 serves as a base or support for the adjacent portion of the membrane 11.

The piston 3 and the housing section 2b define a suction chamber 14 which is sealed from the surrounding atmosphere in order to prevent penetration of air into its interior along the external surfaces of the motion transmitting member 5. The central portion of the piston 3 comprises or carries a cupped sealing member 15 which is sealingly secured to the supporting portion 8 and defines a compartment for the right-hand end portion of the member 5. The bead 15a which surrounds the open end of the cupped sealing member 15 is sealingly held between the innermost part 8b of the supporting portion 8 and a ring-shaped clamp 16 which forms part of or is installed in the compensating device 4.

A coil spring 17 in the suction chamber 14 constitutes an energy storing device which reacts against an internal shoulder of the housing section 2b and bears against the innermost part 8b of the supporting portion 8 to urge the piston 3 to the left-hand end position or starting position which is shown by solid lines. The piston 3 assumes such 10 end position after each actuation of the clutch.

In accordance with a feature of the invention, the servomotor 1 comprises a valve 18 which seals the portion 19 of the suction chamber 14 from a suction generating device 25 (e.g., a suction fan or the like) in response to movement of the piston 3 to the other (right-hand) end position which is indicated by phantom lines. The valve 18 comprises a valving element 18a which, in the illustrated embodiment, is a protuberance at the outer side of the bottom wall of the sealing member 15, and a seat 18b having a sleeve 20 which is installed in the housing section 2b and carries an elastically deformable washer 22. When the washer 22 is engaged by the protuberance 18a, the inlet 21 of the axial passage in the sleeve 20 of the seat 18b is sealed from the portion 19 of the suction chamber 14. The washer 22 can be made of rubber or a similar elastomeric material. The flange at the left-hand end of the sleeve 20 abuts against the inner side of the central portion of the housing section 2b, and the cylindrical part of the sleeve 20 is sealingly received in the body 23a of a valve assembly 23 at the outer side of the section 2b. The assembly 23 is or includes a solenoid-operated valve whose solenoid is shown schematically at 28 and whose valving element 26 is movable by the solenoid against the opposition of a valve spring 27 which tends to maintain the element 26 in the illustrated sealing position.

When the element 26 assumes such sealing position, it seals the axial passage of the sleeve 20 from the axial passage of a pipe 24 which connects the valve body 23a with the suction generating device 25. When the solenoid 28 is energized, the valving element 26 is lifted against the opposition of the spring 27 so that the device 25 can draw air from the suction chamber 14. The parts 20, 23a, 24 define an elongated path for the flow of air from the chamber 14 to the device 25, and the inlet of such path is located at 21. The parts 23, 25 can be said to constitute a means for establishing a pressure differential between the chamber 14 and the atmosphere.

The operation is as follows:

In order to move the motion transmitting member 5 axially, i.e., to actuate the clutch, the solenoid 28 of the valve assembly 23 is energized so that the suction chamber 14 is connected with the device 25 via pipe 24, housing 23a and sleeve 20 of the valve 18. This causes the piston 3 to move from the solid-line position to the phantom-line position and to entrain the member 5 in the same direction (note the arrow 7) through the medium of the compensating device 4. The piston 3 also shifts the cupped sealing member 15 so that the valving element 18a engages the washer 22 and seals the inlet 21 of the passage in the sleeve 20 from the adjacent portion 19 of the suction chamber 14. The compensating device 4 becomes locked (i.e., it is caused to positively engage and entrain the member 5) during the initial stage of movement of the piston 3 in the direction of arrow 7. The piston 3 then overcomes the resistance which the clutch offers to movement of the motion transmitting member 5 in the direction of arrow 7, i.e., the clutch tends to move the member 5 in the direction of arrow 6, the same as the coil spring 17 in the suction chamber 14. The rightward movement of the piston 3 is terminated in automatic response to sealing engagement between the valving element 18a and the washer 22 of the seat 18b, it being assumed here that the valving element 26 is held away from its seat in the body 23a under the action of the energized solenoid 28. The clutch is disengaged when the piston 3 reaches the phantom-line end position. At such time, the valve 18 seals the portion 19 of the suction chamber 14 from the suction generating device 25 and from at least the major part of the aforementioned path so that suction in the portion 19 is less pronounced than at 25. Suction in the chamber portion 19 (when the valve 18 is closed) should barely suffice to ensure that the apparatus or machine (clutch) is properly actuated. In other words, once the valve 18 is closed, the differential between the pressure in the chamber portion 19 and the surrounding atmosphere is normally less than the differential which would be established if the valve 18 would allow the pressure in the chamber 14 to drop all the way to that in the device 25. This means that, when a solenoid-operated valve 29 is actuated for the purpose of allowing the piston 3 to reassume the solid-line position, the pressure in the chamber 14 rises more rapidly than in the absence of the valve 18, i.e., than if the chamber 14 were free to communicate with the suction generating device 25 while the piston 3 assumes its right-hand end position, as viewed in the drawing. Such suction in the chamber 14 (namely, a suction which is less than the maximum suction achievable with the device 25) is beneficial on the additional ground that it reduces the stress upon the membrane 11.

When the valve 29 is actuated to connect the chamber 14 with the atmosphere, while the valve 23 seals the chamber 14 from the suction generating device 25, suction in the chamber portion 19 collapses and the clutch is free to pull the motion transmitting member 5 in the direction of arrow 6, i.e., the piston 3 moves back to the solid-line position. Such leftward movement of the piston 3 is assisted by the coil spring 17 in the chamber 14. The leftward movement of the piston 3 is terminated when the piston abuts against the housing section 2a. The valve 29 (e.g., a solenoid-operated valve assembly which can be identical with or analogous to the valve 23) is actuated during return movement of the piston 3 to the solid-line position. The arrangement may be such that the valve 29 is closed when the valve 23 opens to connect the chamber 14 with the suction generating device 25, and that the valve 29 opens when the valve 23 closes to seal the chamber 14 from the device 25. The valves 23 and 29 can be actuated in accordance with a predetermined program, e.g., as a function of one or more parameters of the engine in an automotive vehicle which embodies the clutch. Such parameters can include the load upon the engine, the RPM of the engine and/or others.

An important advantage of the improved servomotor, and more particularly of the shutoff valve 18, is that the pressure in the chamber 14 in the second end position of the piston 3 does not appreciably deviate from that pressure which is absolutely necessary for actuation of the clutch. This is especially advantageous when the chamber 14 is a suction chamber, i.e., the pressure in the portion 19 of the chamber 14 need not be reduced below that pressure which is indispensable to hold the piston 3 in the corresponding (second or right-hand) end position. The portion 19 of the chamber 14 can be said to constitute a dead space which is unavoidable (in the absence of extremely costly and complex undertakings in order to ensure that the right-hand side of the piston 3 will conform to the inner side of the housing section 2b in the phantom-line end position of the piston) in a servomotor of this character. The pressure differential between the portion 19 of the suction chamber 14 and the atmosphere in sealing position of the shutoff valve 18 can be less pronounced than the maximum pressure differential which is achievable when the chamber 14 is free to communicate with the suction generating device 25 along the path which is defined by the sleeve 20, valve body 23a and pipe 24. Consequently, when the piston 3 is to be returned to the solid-line end position, the pressure differential between the portion 19 of the chamber 14 and the atmosphere is reduced to zero more rapidly (by opening the solenoid-operated valve 29) than if the elimination of pressure differential would have to proceed from that value which such pressure differential assumes while the chamber 14 is free to communicate with the suction generating device 25, i.e., while the valves 18 and 23 are open.

Moreover, and as already mentioned above, the stress upon the membrane 11 is reduced considerably due to the fact that the valving element 18a seals the inlet 21 of the sleeve 20 as soon as the piston 3 reaches, and while the piston 3 dwells in, the phantom-line end position. This will be readily appreciated since the pressure differential between the opposite sides of the membrane 11, in the closed position of the shutoff valve 18, is less than at the time when the suction chamber 14 communicates with the suction generating device 25.

The shutoff valve 18 can be modified in a number of ways without departing from the spirit of the invention. For example, parts of the valve 18 need not be provided on the piston 3 and/or housing 2; all that counts is to ensure that the path along which a gaseous fluid can flow into or from the portion 19 of the chamber 14 is automatically sealed when the piston 3 assumes its right-hand end position. All parts of the shutoff valve can be mounted in or on the housing 2, and the servomotor 1 can comprise an actuating element which closes the shutoff valve in or on the housing 2 as soon as the piston reaches, and as long as the piston remains in, its right-hand end position.

The provision of a shutoff valve, one portion of which is separably (as at 8b) or permanently connected to and thus shares all movements of the piston 3, contributes to compactness and simplicity of the shutoff valve as well as to simplicity and compactness of the entire servomotor 1. The portion 18b of the shutoff valve 18 can constitute an integral part of the housing section 2b. Also, the cupped sealing means 15 can form an integral part of the piston 3.

If the chamber 14 is, or is replaced by, a plenum chamber, the suction generating device 25 is replaced by a source of compressed gaseous fluid. The shutoff valve then ensures that the pressure in the plenum chamber, in the right-hand end position of the piston and in closed position of the shutoff valve, is less than the maximum pressure of fluid in the just mentioned source.

The utilization of the improved servomotor as a means for actuating or operating the disengaging means of a friction clutch constitutes but one of the presently preferred uses of the servomotor. Certain types of conventional servomotors can be converted to exhibit the features and advantages of the improved servomotor by equipping the conventional servomotors with shutoff valves which close when the volume of the suction chamber or plenum chamber is reduced to a minimum value.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A fluid-operated servomotor for actuation of clutches in automotive vehicles or the like, comprising a prime mover including a first component constituting a cylinder and a second component constituting a piston reciprocable in said cylinder between first and second end positions and defining with the cylinder a chamber whose volume changes in response to movement of said piston between said end positions; means for yieldably urging said piston to one of said end positions; means for moving said piston to the other of said end positions, including means for establishing a pressure differential between said chamber and the atmosphere, said pressure differential establishing means including a device for maintaining a body of air at a given pressure and means defining a path for the flow of fluid between said device and said chamber; and a valve for sealing said path in response to movement of said piston to said other end position, said valve including a first portion comprising a valving element provided on and movable with said piston and a second portion comprising a seat provided on said cylinder and sealingly engaged by said valving element in said other end position of said piston so that the chamber is then sealed from said device, the pressure in said chamber deviating from said given pressure in said other end position of said piston.

2. The servomotor of claim 1, wherein said path defining means includes a second valve which is actuatable to permit or prevent the flow of fluid along said path.

3. The servomotor of claim 2, wherein said, second valve is disposed downstream of said first named valve, as considered in the direction of fluid flow from said chamber along said path.

4. The servomotor of claim 2, further comprising a third valve which is actuatable to connect said chamber with or to seal said chamber from the atmosphere when said second valve is respectively closed and open.

5. The servomotor of claim 1, wherein at least one of said portions of said valve is separably secured to the respective component of the prime mover.

6. The servomotor of claim 1, wherein said chamber is a suction chamber and said device is a suction generating device arranged to draw air from said chamber along said path in the open position of said valve.

7. The servomotor of claim 1, wherein said piston includes a deformable membrane which undergoes deformation in response to movement of said piston between said end positions.

8. The servomotor of claim 7, wherein said path defining means comprises a solenoid-operated valve which is actuatable to close and open said path independently of said first named valve.

9. The servomotor of claim 8, wherein said device is a suction generating device arranged to draw air from said chamber along said path in the open positions of said valves.

10. The servomotor of claim 1, wherein said biasing means comprises a spring reacting against a portion of said housing and bearing against said piston.

11. The servomotor of claim 1, wherein said chamber is a suction chamber and said device includes means for evacuating air from said chamber along said path.

12. The servomotor of claim 11, wherein the volume of said chamber is reduced to a minimum value in the second end position of said piston.

13. A fluid-operated servomotor for actuation of clutches in automotive vehicles or the like, comprising a prime mover including a first component constituting a cylinder and a second component constituting a piston reciprocable in said cylinder between first and second end positions and defining with the cylinder a chamber whose volume changes in response to movement of said piston between said end positions; means for yieldably urging said piston to one of said end positions; means for moving said piston to the other of said end positions, including means for establishing a pressure differential between said chamber and the atmosphere, said pressure differential establishing means including means defining a path for the flow of fluid to or from said chamber; and a valve for sealing said path in response to movement of said piston to said other end position, said valve including a first portion comprising a valving element and a second portion comprising a seat provided on said cylinder and sealingly engaged by said valving element in said other end position of said piston, said piston including a cupped member a portion of which constitutes said valving element and said seat having an annular sealing element surrounding a portion of said path.

14. The servomotor of claim 13, wherein said cupped member consists of an elastomeric material.

15. The servomotor of claim 13, wherein said valving element consists of a synthetic plastic material.

16. A fluid-operated servomotor for actuation of clutches in automotive vehicles or the like, comprising a prime mover including a first component constituting a cylinder and a second component constituting a piston reciprocable in said cylinder between first and second end positions and defining with the cylinder a chamber whose volume changes in response to movement of said piston between said end positions; means for yieldably urging said piston to one of said end positions; means for moving said piston to the other of said end positions, including means for establishing a pressure differential between said chamber and the atmosphere, said pressure differential establishing means including means defining a path for the flow of fluid to or from said chamber; a first valve for sealing said path in response to movement of said piston to said other end position, said valve including a first portion comprising a valving element provided on and movable with said piston and a second portion comprising a seat provided on said cylinder and sealingly engaged by said valving element in said other end position of said piston; and two additional valves, one of said additional valves being actuatable to open and close said path independently of and downstream of said first valve, as considered in the direction of fluid flow from said chamber and the other of said additional valves being actuatable to seal said chamber from or to connect said chamber with the atmosphere independently of said first valve.

* * * * *